Patented Apr. 24, 1928.

1,667,670

UNITED STATES PATENT OFFICE.

WILLIAM M. NEELEY, OF AMARILLO, TEXAS, ASSIGNOR TO NEELEY CHEMICAL COMPANY, OF AMARILLO, TEXAS, A CORPORATION OF NEVADA.

BOILER COMPOUND.

No Drawing. Application filed December 9, 1926. Serial No. 153,732.

This invention relates to and has for its object the production of a compound for use in steam boilers to prevent the formation therein of lime scale and to cause the precipitation of the scale forming ingredients in the water to the bottom of the boiler and to effect the removal of scale already in the boiler.

The compound consists of water glass, caustic soda, tannic acid, soda ash and water.

In preparing the compound, one gallon of water glass, one and one-half gallons of caustic soda, one gallon of tannic acid, three gallons of soda ash, and ten gallons of water are placed in a vat and heated to the boiling point and stirred. After the solid ingredients have been dissolved, thirty-three and one-half gallons of water are added, and the ingredients are again heated to the boiling point, after which the compound is ready for use.

The respective proportions of the ingredients of the compound are, water glass 2%, caustic soda 3%, tannic acid 2%, soda ash 6% and water 87%.

As the compound is in liquid form, it may be fed to the boiler through a feed pump or injector, or if desired, it can be regularly fed into the feed water line by a lubricator. The compound mixes readily with the water in the boiler, and functions to preserve the boiler.

The compound having the ingredients in proportions stated is especially adapted for use in water found in and about Amarillo, Texas, and has produced highly satisfactory results. The proportions of the ingredients may be varied as required by the percentage of scale forming ingredients in the water of other localities.

I claim:

A boiler compound consisting of one gallon of water glass, one and one-half gallons of caustic soda, one gallon of tannic acid, three gallons of soda ash, and a quantity of water sufficient to make a batch of fifty gallons.

In testimony whereof I affix my signature.

WILLIAM M. NEELEY.